United States Patent [19]

Rainer et al.

[11] 3,957,059

[45] May 18, 1976

[54] SMOKING PRODUCT AND PROCESS

[75] Inventors: Norman B. Rainer; Peter Allen Wilson, both of Richmond, Va.

[73] Assignee: Philip Morris Incorporated, New York, N.Y.

[22] Filed: Feb. 10, 1975

[21] Appl. No.: 548,240

[52] U.S. Cl. .............................. 131/10 R; 131/267
[51] Int. Cl.² ................. A24B 15/027; A24D 1/04; A24F 25/00
[58] Field of Search ............ 131/267, 261, 10–10.9, 131/264, 265

[56] References Cited
UNITED STATES PATENTS
3,434,479  3/1969  Till et al. .................... 131/265 X
FOREIGN PATENTS OR APPLICATIONS
6,503,794  9/1965  Netherlands ..................... 131/10 R

*Primary Examiner*—Robert W. Michell
*Assistant Examiner*—V. Millin
*Attorney, Agent, or Firm*—Watson, Leavenworth, Kelton & Taggart

[57] ABSTRACT

Novel compositions are prepared by impregnating activated alumina with sodium permanganate and a basic sodium compound. When used as a granular filter material in combination with a tobacco product as in a smoking article comprising a cigarette in combination with the filter materials, nitrogen oxides can be significantly reduced in the smoke obtained from the tobacco product after the filter material is stored for long periods of time in the presence of the volatile components of the tobacco product and/or moisture. Activated carbon may also be combined with the composition.

16 Claims, No Drawings

SMOKING PRODUCT AND PROCESS

SUMMARY OF THE INVENTION

Novel compositions are disclosed comprising activated alumina impregnated with sodium permanganate and a basic sodium compound. The alumina contains less than about 6% by weight of silica based on said alumina and has a surface area of from about 100 to about 400 m$^2$/gm and a pore volume of from about 0.2 to about 0.8 cc/gm. The sodium permaganate is present in an amount from about 5 to about 30% by weight of the composition, and the basic sodium compound is present in an amount such that the molar ratio of the basic sodium compound to the sodium permanganate is from about 1/0.5 to about 1/20. The composition also has a moisture content of from about 5 to about 30% by weight based on the composition. The composition, preferably having a particle size of from about 8 to about 100 mesh U.S. Sieve Series ASTME11–61, may be used in combination with a tobacco product as a tobacco smoke filter material. The present composition may also be mixed with from about 25 to about 50% by weight of activated carbon granules to provide a filter material for use in combination with a tobacco product.

Experimental data show that some prior art filter materials employing permanganates alone on alumina did not remove oxides of nitrogen after storage in the presence of the volatile components of a tobacco product and/or moisture. These prior art materials did not convert carbon monoxide to carbon dioxide at room temperature whereas the compositions of the invention did.

DETAILED DESCRIPTION OF THE INVENTION

The present invention relates to a novel composition and to a smoking article and process comprising a filter material in combination with a toabacco product in which the filter material can remove nitrogen oxides from tobacco smoke. The filter material of the smoking article is resistant to deactivation in the course of storage of the smoking article.

Tobacco smoke produced from a tobacco product used in smoking articles such as cigarettes, pipes and cigars, is substantially an aerosol of droplets and/or particles of material suspended in a gas phase. The tobacco product may be in the form of shredded or whole tobacco leaf or may be in the form of comminuted tobacco with a binder or may be in other forms. The suspended droplets and/or particles are referred to as the total particulate matter (TPM) of the smoke. The TPM can be removed in part from the smoke stream by filtration devices attached to the smoking article which function to mechanically intercept and retain the suspended material. If complete removal of TPM is desired, a standard Cambridge filter pad may be emloyed which consists of a 1 mm thick circular mat of 45 mm diameter made of extremely fine diameter glass fibers. The portion of the smoke which passes through the Cambridge filter pad, under standard testing conditions, is referred to as the gas phase of the smoke.

Both the TPM and gas phase portions of tobacco smoke consist of a complex mixture of components which, collectively, produce the taste and aroma obtained from smoking a tobacco product. Some of the constituents of the gas phase, such as nitric oxides, detract from the taste and aroma.

Some prior art means for removal of gas phase components from cigarette smoke consist of a bed of granules of an active material in a compartment of a cigarette filter, through which the smoke passes. The most common granular filter materials used in this respect are silica gel and activated carbon. These materials, although capable of removing certain gas phase components do not remove nitric oxide.

Granular filter materials for the removal of nitrogen oxides, such as NO and NO$_2$, from cigarette smoke have also been disclosed in U.S. Patent 3,390,688 to Touey et al. which describes the use of sodium chlorite deposited on alumina and in U.S. Pat. No. 3,434,479 to Till et al. in which permanganates deposited on various solids substrates are disclosed. Silver permanganate has also been mentioned for the removal of nitrogen oxides.

Although the sodium chlorite of Touey et al. removes nitrogen oxides, it undersirably adds chlorine to the smoke. The Till et al. materials, when freshly prepared, removed a portion of the nitrogen oxides from cigarette smoke, but the activity of the materials diminishes so rapidly with aging and with exposure to moisture that they are completely ineffective, and, consequently, are impractical in a commercial application. Silver permanganate, although potentially effective, is too expensive for use in filters for tobacco products.

After fabrication, smoking articles such as cigarettes are packaged in a generally impermeable enclosure in order to preserve the freshness of the product, particularly for the several months which may elapse before the package reaches the consumer. There is a high content of mosiure vapor and volatile organic compounds which are trapped in the sealed package and originate from a tobacco product. Prior to its being opened by the ultimate consumer, the package may be exposed to temperatures ranging from about 30°F. to 120°F. Under such conditions of packaging and storage, many materials, initially active for smoke filtration, lose all activity.

An object of this invention is to overcome these and other difficulties encountered in the prior art and to provide a tobacco smoke filter material capable of removing nitrogen oxides from tobacco smoke. Another object is to provide a smoking article in combination with a filter material capable of removing nitrogen oxides from tobacco smoke, said material retaining its capability of removing nitrogen oxides even after prolonged storage in a sealed packaged having entrapped therein volatile organic compounds originating from a tobacco product and/or moisture.

These and other objects of the invention are accomplished by providing a reactive granular material prepared by applying an aqueous solution containing sodium permanganate and a basic sodium compound to substantially silica-free alumina granules having a surface area from about 100 to about 400 m$^2$/gm and a pore volume from about 0.2 to about 0.8 cc/gm, and drying the product obtained to a moisture content from about 5 to about 30% by weight of the impregnated alumina. This reactive granular material comprises the filter material of the present invention.

It has been found that of all the water soluble permanganate salts, only sodium permanganate fulfills the requirements of the present invention. The most practical concentration of the sodium permanganate in the aqueous solution applied to the alumina ranges from about 10% by weight to saturation. The amount and concentration of sodium permanganate sodium employed are such that the treated alumina will contain from about 5 to about 30% and preferably from about 10 to about 20% by weight of sodium permanganate.

Basic sodium compounds which may be utilized according to the invention comprise sodium hydroxide, sodium carbonates, sodium phosphates, sodium borates and the like or mixtures thereof. The molar ratio of basic sodium compound to sodium permanganate utilized in the treatment solution may be from about 1/0.5 to about 1/20. At ratios below about 1/20, the filter material demonstrates rapid and significant loss of activity upon storage in a sealed package containing volatile organic compounds from tobacco products and/or moisture. At ratios above 1/0.5, the capacity of the material to remove nitrogen oxides diminishes.

The alumina employed is the so-called "activated" alumina which is produced by heating alumina hydrates for a sufficient period of time and at a controlled temperature to drive off most of the water of hydration so as to obtain maximum surface area. The alumina employed has a surface area of from about 100 to about 400 m$^2$/gm, and a pore volume from about 0.2 to about 0.8 cc/gm. It has been found that, at surface areas below about 100 m$^2$/gm or at pore volumes below about 0.2 cc/gm, the filter material will not function to remove nitrogen oxides from tobacco smoke. For the purposes of the present invention, the surface area of the alumina is determined by the B.E.T. gas adsorption method, as described in Brunauer, S., Emmett, P.H., and Teller, E. "The Adsorption of Gases in Multimolecular Layers", J. Am. Chem. Soc. 60, 309–16(1938). This method involves the measurement of the quantity of nitrogen required to cover the entire internal and external surface of a thoroughly degassed alumina sample with a layer one molecule thick.

The pore volume of the alumina granules is determined by the mercury-helium method. A bulb of accurate volume is filled with the material to be tested, and evacuated. The bulb is then saturated with helium, which fills not only the external dead-space among the solid particles but also all internal pore volumes down to about 10 A diameter. This amount of helium is measured and evacuated from the bulb, which is then filled with mercury. Since mercury will penetrate no cavities less than 100,000 A diameter at atmospheric pressure, the mercury is equivalent to only the external dead space. The difference then between the helium volume and the mercury volume is the pore volume within the alumina including all pores down to about 10 A diameter.

A most surprising feature of the present invention is the discovery that, if the alumina contains as much as about 6% by weight of silica based on the alumina, it will not produce an acceptable material. The preferred alumina for use in the practice of the present invention will contain less than about 2% by weight of silica based on the alumina. This is particularly significant because, in most methods for the production of alumina, silica is present either because of its association with the starting materials from which the alumina is made or because the silica is deliberately added to strengthen the resultant alumina. The critically adverse effect of silica in producing a filter material capable of removing nitrogen oxides is not disclosed by Till et al. but instead teach silica gel as an equivalent to alumina as a support material.

The alumina is utilized in the form of granules having a particle size ranging from about 8 to about 100 mesh (U.S. Sieve Series, ASTME-11–61). A mesh size in the range of from 10 to about 80 is preferred, and an especially preferred range is from about 20 to about 60, for cigarette filters. In expressing granule size by mesh numbers it is to be understood that each range signifies that granules will pass through the coarser sieve designated (the smaller sieve number) and will be retained on the finer sieve designated (the larger sieve number). Granules having a size finer than about 100 mesh generally cause too high a resistance to draw in the cigarette. Granules larger than about 8 mesh produce reduced efficiency of removal of nitrogen oxides.

Following the impregnation of the alumina with the sodium permanganate solution, water is evaporated from the granules. The evaporation is carried out at temperatures below about 120°C., and preferably at temperatures from about 0°C. to about 50°C. The evaporation may be carried out with the aid of a vacuum or a stream of dry inert gas such as nitrogen. The extent of drying is such that the granules will retain from about 5 to about 30% by weight of water based on the impregnated alumina. It has been found unexpectedly, that if excessive drying is carried out, particularly under vacuum conditions, the product loses its ability to remove nitrogen oxides from tobacco smoke.

Although the inventors do not wish to be limited by any theory, the filter material of this invention appears to function by oxidizing the NO in cigarette smoke to $NO_2$, and absorbing the $NO_2$ formed. A typical cigarette containing about 1 gram of blended tobacco, when smoked in the standard manner to give about 9 puffs, may deliver from about 300 to about 400 micrograms of nitrogen oxides in the gas phase of the smoke, as determined by infrared analysis. Freshly-formed tobacco smoke contains nitric oxide (NO). However, in the time period required to collect and analyze the smoke, the NO reacts to some extent with oxygen present in the smoke to form $NO_2$, which in turn partially dimerizes to form $N_2O_4$. The total of such nitrogen oxides is generally referred to, for convenience, as $NO_x$.

For the purpose of this invention, nitrogen oxide determinations on cigarette smoke were carried out by infrared analysis which provides a value representative of all the nitrogen oxides ($NO_x$), and also by U.V. spectroscopy methods which directly determine NO before it interacts with oxygen to form other oxides of nitrogen. By both methods, it has been found that the filter material of this invention is capable of reducing the $NO_x$ content of tobacco smoke by about 30 to about 80%, even after prolonged storage of the filter material in a sealed package of cigarettes. A degree of $NO_x$ reduction below about 30% would not be considered very significant, and reductions exceeding about 80% will affect other smoke components and cause an undesired change in the subjectively-perceived qualities of the smoke.

It has been found that the storage stability of the active granules, and their efficiency for $NO_x$ removal can be improved by blending the granules with granules of active carbon. For this purpose, the active carbon is a variety generally employed for gas adsorption, having a surface area of at least about 800 m$^2$/gm, and ranging as high as about 1600 m$^2$/gm. The carbon granules are preferably employed in an amount to form about 25 to about 50% by weight of the total mixture. The mesh size of the carbon may be comparable to the size of the alumina. However, since the carbon has a lower density than alumina, carbon granules having a smaller size than the alumina granules are preferred in order to minimize gravimetric sedimentation and separation effects.

The improved results obtained with the mixture of carbon granules and filter material is highly unexpected in view of the completely opposite effect reported in the Till et al. patent.

The filter material, whether employed per se or in admixture with carbon granules, can be utilized as a bed in a space between plugs of a standard cellulose acetate filter rod. The filter assembly is then abutted against a cylinder of tobacco, and a paper wrapper may be employed to fasten the filter to the tobacco rod. Alternatively, the filter material may be separable from the smokeable tobacco product, such as a filter unit adaptable for use with a cigarette or cigar holder. In similar fashion, a filtering device employing the material of this invention can be appropriately packed into the stem of a tobacco pipe. In all such filter configurations, the granulecontaining filter will have a resistance to draw (RTD) of less than about 3″ water when measured at a flow rate of air of 1050 cc/min. Acceptable RTD and $NO_x$ removal can be achieved by using from about 100 to about 400 mg of the filter material of this invention in the specified mesh size.

A further advantage of the filter material of this invention is that it has shown the ability to oxidize Co to $CO_2$ at room temperature (21°C.). For example, when a synthetic gas mixture consisting of 2.46% CO, 13.7% $O_2$, 5.56% $CO_2$ and 78.28% $N_2$ is passed at a flow rate of 40 cc/min. throught a 25 mm long bed of 40/80 mesh granules of the filter material in a glass tube of 7 mm inside diameter, it is found that essentially complete removal of the CO is obtained for a considerable period of time. Materials of the prior art, which utilize permanganates of the alkali or alkaline earth metals deposited on a solid carrier substrate, do not exhibit the ability to remove CO under the conditions delinated above unless noble metal catalysts are present.

By employing the filter material of this invention in tubes of 25 to 75 mm lengths utilized in cigarette filter holders, removal of carbon monoxide from the tobacco smoke may be achieved. This result is especially obtainable when the tubes are sealed in the course of storage, and are opened just prior to use.

Although synergistic effects are obtained with alumina impregnated with permanganate and a basic solution admixed with carbon granules, it should be understood that other granular materials may be advantageously utilized with the filter material. Such other materials e.g. silica gel, synthetic polymers, cellulose, porous materials carrying active substances, and other materials generally known in the cigarette filter art, may be utilized to either selectively absorb other components of the smoke, or flavor compounds may be used in combination with the filter material.

The following examples are illustrative:

EXAMPLE 1

A solution was made consisting of 25 grams $NaMnO_4$, 2.5 grams NaOH and 100 cc distilled water. Fifty grams of 30–50 mesh alumina (type RA-1, marketed by the Reynolds Metals Company of Richmond, Virginia) was employed. This grade of alumina has a surface area of 190 $m^2/gm$, a pore volume of 0.25 cc/gm and a silica content of 0.1%. The alumina was placed in a filter funnel having a fritted glass plate, and the solution poured into the funnel so as to cause the alumina to become immersed therein. After an immersion time of about 5 minutes at room temperature (21°C), a vacuum was applied to the bottom of the funnel, causing removal of the solution through the fritted glass plate. Solution-impregnated alumina granules were obtained, placed in a vacuum oven and dried at 35°C. to a moisture content of 15%. The resultant filter material contained 12% by weight of sodium permanganate.

The exact amount of permanganate on the alumina granules was determined by placing a carefully weighed amount of the filter material in a beaker of water and titrating to a colorless endpoint at 60°C with 0.1 M oxalic acid in acidic solution. The equation for the titration reaction is:

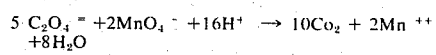

The filter material was combined with a cigarette by fabricating it into a cigarette filter by placing 400 mg of the filter material in a 10 mm space between two 5 mm lengths of cellulose acetate filter rods in a paper tube of 8 mm diameter. The 5 mm plugs of cellulose acetate filter rod each weighing about 30.5 mg were fabricated from a 40,000 denier tow containing Y cross-section filaments of 8 denier per filament. This filter assembly had an RTD of 2.5″ water when tested at an air flow velocity of 1050 cc/min. The filter was attached by means of a paper overwrap to an 85 mm length University of Kentucky IRI Reference cigarette, described in a research bulletin entitled *The Reference Cigarette*, published by the University of Kentucky, August 29, 1964. The overall cigarette and filter combination had an RTD of 5″ water at an air flow velocity of 1050 cc/min.

The cigarettes were then placed in a standard 20 cigarette package, consisting of an inner layer of metalized foil paper, an overwrap paper coated with clay and a binder and an outer wrap of 0.8 mil thick polypropylene film which was heat sealed to itself along its entire edge. The heat-sealed package was subjected to accelerated storage and aging cycles by placing it first in a circulating air chamber at 110°F. and 15% R.H. for four days, and then in a circulating air chamber at 90°F. and 85% R.H. for seven days. The cycle was then repeated once. This accelerated aging method has been found to simulate the storage history of cigarettes under extremely adverse conditions.

The cigarettes combined with the filter material that were thus subjected to accelerated storage and aging cycles were tested by the following:

a. Two cigarettes subjected to the aforesaid accelerated storage and aging cycles were simultaneously smoked on an electric smoking machine which drew air through the lit cigarette in puffs of 2 secs. duration, 35 cc of air/puff, and permitting 60 seconds of static burn between puffs. The smoke from 8 puffs was passed through a Cambrige filter pad to remove TPM. The resultant gas phase of the smoke was combined through a common manifold and collected in a previously evacuated one meter infrared gas cell. The gas in the cell was then subjected to an infrared spectroanalysis, using a Perkin-Elmer 221 infrared spectrophotometer with ordinate scale expansion. Three replicate samples were taken. The identical procedure was used with two control cigarettes which were identical to the cigarettes combined with the filter material except that the filter was made entirely from a 20 mm length of the cellulose acetate tow without incorporating the filter material of our invention. The absorption band at 6.15 microns wavelength represents the total nitrogen oxide content ($NO_x$) of the smoke. Comparison of the absorption band height from the cigarette combined with the filter material and the control cigarettes indicated that a 42% reduction in $NO_x$ was achieved by the filter material of the invention. The 42% reduction in $NO_x$ was calculated as a 42% reduction of height of the 6.15 micron I.R. peak in comparison with the peak height for the control cigarette.

b. Five cigarettes subjected to the aforesaid accelerated storage and aging cycles were machine-smoked by the method of (a) above. The smoke was mixed in a manifold system and aliquots of the smoke were passed through a tube containing activated carbon and into a previousy evacuated ten centimeter quartz cell. The gas in the cell was analyzed using a Cary Model 11 spectrophotometer which scanned from 212–217 nm (UV region). Peak heights in this wavelength region were compared with peak heights provided by a control gas containing 0.5% NO in helium. The identical procedure was used with two control cigarettes. Based on 11 puffs, the control cigarette was found to deliver 360 micrograms of NO. The cigarettes provided with the filter material of this invention delivered only 186 micrograms of NO per 11 puffs, representing a 48% reduction in NO delivery. The 48% reduction in NO delivery was based on a 48% reduction in the 212–217 micron peak in comparison to the peak of the control cigarette in this region.

EXAMPLE 2

Utilizing the alumina starting material of Example 1, sodium permanganate solutions were prepared having the same sodium permanganate content but having different amounts and types of basic sodium compounds. The various solutions prepared are indicated in Table 1.

The solutions were employed in the manner of Example 1 for the impregnation of alumina granules, and the impregnated alumina granules were processed, fabricated into a filter material in combination with a cigarette, packaged, aged and tested in the manner of Example 1, using the I.R. method of analysis. The results obtained are shown in Table 1.

As the results of Table 1 demonstrate, the presence of the basic sodium compound is required to secure activity for $NO_x$ removal, after aging the tobacco article.

EXAMPLE 3

Employing the alumina granules and method of permanganate impregnation of Example 1, a series of filter materials were made wherein the content of sodium permanganate in the alumina granules was varied by means of utilization of solutions of sodium permanganate and basic sodium compounds of different concentrations. The basic sodium compound was sodium hydroxide, in an amount to provide a mole ratio of ⅓ $NaOH/NaMnO_4$ in the solution. The impregnated alumina granules were processed, fabricated into a filter material in combination with a cigarette, packaged, aged and tested as in Example 1 by the infrared method. The permanganate level, and results obtained, are presented in Table 2.

TABLE 2

| $NaMnO_4$* | % $NO_x$ Reduction |
|---|---|
| 1% | 0 |
| 2.5% | 0 |
| 5% | 12% |
| 10% | 67% |
| 20% | 51% |
| 50% | 40% |

*weight % based on the total dry weight of the permanganate/alumina granules

EXAMPLE 4

The method of permanganate impregnation of alumina granules of Example 1 was used; however, sodium permanganate was replaced with other metal permanganate salts. The total level of permanganate in each case was adjusted so as to provide a content of $MnO_4^-$ of about 10% by weight of the impregnated alumina granules. The impregnated alumina granules were processed, fabricated into a filter material in combination with a cigarette, packaged, aged and tested by the infrared method of analysis as in Example 1. The permanganates studied, and results obtained, are presented in Table 3.

TABLE 3

| PERMANGANATE | % $NO_x$ REDUCTION |
|---|---|
| $Ba(MnO_4)_2$ | 16 |
| $Ca(MnO_4)_2$ | 26 |
| $Mg(MnO_4)_2$ | 28 |
| $Zn(MnO_4)_2$ | 19 |
| $LiMnO_4$ | 25 |
| $NaMnO_4$ | 62 |
| $KMnO_4$ | 0 |

The results of this example are unexpected in that of the three alkali metal permanganates tested, (lithium, sodium and potassium permanganates) only lithium and sodium permanganate worked. It is also unex-

TABLE 1

| | Treatment Solution | | | % $NO_x$ Reduction |
|---|---|---|---|---|
| | $NaMnO_4$* | $H_2O$* | Base* | Base/$NaMnO_4$** |
| NaOH | 25 | 100 | 0 | 0 | 0 |
| | 25 | 100 | 2.5 | 1/2.8 | 63 |
| | 25 | 100 | 10 | 1/.70 | 31 |
| $Na_2CO_3$ | 25 | 100 | 2.5 | 1/7.5 | 59 |
| | 25 | 100 | 10 | 1/1.9 | 56 |
| $Na_3PO_4$ | 25 | 100 | 2.5 | 1/11.6 | 61 |
| | 25 | 100 | 10 | 1/2.9 | 58 |

*Parts by weight
**Molar ratio pected that sodium permanganate is more than two times as effective as the other materials tested.

EXAMPLE 5

The solution of permanganate and basic sodium compound of Example 1 was utilized in treating a number of different granular substrates having a 30/50 mesh size to illustrate the critical role played by the granular substrates. The resultant permanganate-containing granules were processed, fabricated into a filter material in combination with a cigarette, packaged, aged, and tested by the infrared method of analysis as in Example 1. The results obtained are shown in Table 4, and illustrate the superiority of alumina containing less than about 6% by weight of silica. All percentage figures in Table 4 are based on weight.

TABLE 4

| Substrate | % $NO_x$ Removal |
|---|---|
| Alumina (Alcoa H-51) - 5.8% $SiO_2$, 350 $m^2$/gm, 0.5 cc/gm | 32 |
| Alumina (Alcoa F-1) - .09% $SiO_2$, 210 $m^2$/gm, 0.25 cc/gm | 57 |
| Alumina (Alcoa G-220) - .02% $SiO_2$, 350 $m^2$/gm, 0.2 cc/g | 63 |
| Alumina - 6.3% $SiO_2$, 390 $m^2$/gm, 0.3 cc/g | 0 |
| Silica gel - 99.7% $SiO_2$, 800 $m^2$/gm, 0.45 cc/g | 0 |
| Kaolin - aggregate | 0 |
| Magnesia-98% MgO, 21 $m^2$/gm, 0.30 cc/g | 0 |
| Perlite | 0 |
| $ZrO_3$ - 98% $ZrO_3$, 2% $Al_2O_3$, 50 $m^2$/gm, 0.21 cc/g | 0 |
| Diatomic. Earth - aggregate 67% $SiO_2$, 12% MgO, 12% $Al_2O_3$, 130 $m^2$/gm, 0.4 cc/g | 20 |
| ZnO - 100% ZnO, 3 $m^2$/g, 0.26 cc/g | 0 |
| Carbon (Atlas-Darco) - surface area 600 $m^2$/gm | 0 |
| Molecular Sieves - 56% $Al_2O_3$, 33% $SiO_2$, 450 $m^2$/g | 0 |
| $TiO_2$ - 86% $TiO_2$, 14% $Al_2O_3$, 60 $m^2$/g, 0.30 cc/g | 10 |
| Porous polystyrene/divinylbenzene - 400 $m^2$/gm | 0 |

EXAMPLE 6

Alumina granules were impregnated and processed according to the method of Example 1 using a solution of 25 grams $NaMnO_4$, 2.5 grams NaOH, and 100 grams distilled water. The resultant impregnated granules contained 12% by weight of $NaMnO_4$. In a series of experiments, the impregnated granules were blended with 30/70 mesh granules of an activated carbon (PCB carbon of the Pittsburgh Carbon Co.) having a surface area of 1200 $m^2$/gram to form a filter material. The impregnated alumina filter material, and the various blends thereof with carbon, were combined with cigarettes, packaged, aged, and tested by the procedure of Example 1 employing the U.V. analysis for NO content. The space between the filter plugs was varied between 10 and 15 mm so as to accomodate 400 mg of filter material, activated carbon or mixtures thereof. The results are listed in Table 5.

The data of Table 5 demonstrate that there is a synergistic effect in the combination of the impregnated alumina granules with the carbon granules. Neither material, in pure form, can achieve the results obtained with the combination.

TABLE 5

| Weight of Permanganate/Alumina Granules (mg) | Weight of Carbon Granules (mg) | % NO Reduction |
|---|---|---|
| 400 | 0 | 43 |
| 300 | 100 | 68 |
| 200 | 200 | 62 |
| 100 | 300 | 48 |

TABLE 5-continued

| Weight of Permanganate/Alumina Granules (mg) | Weight of Carbon Granules (mg) | % NO Reduction |
|---|---|---|
| 0 | 400 | 0 |

Although the invention has been described by reference to some embodiments, it is not intended that the novel filter material or smoking article be limited thereby and that certain modifications are intended to be included within the broad scope and spirit of the foregoing disclosure and following claims.

What is Claimed is:

1. A composition comprising activated alumina impregnated with sodium permanganate and a basic sodium compound, said alumina containing less than about 6% by weight of silica based on said alumina, said alumina also having a surface area of at least about 100 $m^2$/gm and a pore volume of at least about 0.2 cc/gm, said sodium permanganate being present in an amount from about 5 to about 30% by weight of said composition, said basic sodium compound being present in an amount such that the molar ratio of said basic sodium compound to said sodium permanganate is from about 1/0.5 to about 1/20, said composition having a moisture content of from about 5 to about 30% by weight based on said composition.

2. The composition of claim 1 admixed with from about 25 to about 50% by weight of activated carbon having a surface area of from about 800 $m^2$/gm to about 1600 $m^2$/gm.

3. The composition of claim 1 where said basic sodium compound is at least one member selected from the group consisting of sodium hydroxide, sodium carbonates, sodium phosphates and sodium borates.

4. The composition of claim 2 where said basic sodium compound is at least one member selected from the group consisting of sodium hydroxide, sodium carbonates, sodium phosphates and sodium borates.

5. A filter material for tobacco smoke comprising a composition of activated alumina impregnated with sodium permanganate and a basic sodium compound, said alumina containing less than about 6% by weight to silica based on said alumina, said alumina also having a surface area of from about 100 to about 400 $m^2$/gm and a pore volume of from about 0.2 to about 0.8 cc/gm, said sodium permanganate being present in an amount from about 5% to about 30% by weight of said composition, said basic sodium compoiund being present in an amount such that the molar ratio of said basic sodium compound to said sodium permanganate compound from about 1/0.5 to about 1/20, said composition having a moisture content of from about 5% to about 30% by weight based on said composition; said composition having a particle size from about 10 to about 80 mesh U.S. Sieve Series, ASTME-11-61.

6. The filter material of claim 5 having admixed therewith from about 25 to about 50% by weight of activated carbon granules having a surface area from about 800 $m^2$/gm to about 1600 $m^2$/gm, the particle size of said activated carbon being less than the particle size of said activated alumina.

7. The filter material of claim 6 where said basic sodium compound is at least one member selected from the group consisting of sodium hydroxide, sodium carbonates, sodium phosphates and sodium borates.

8. The filter material of claim 7 having a resistance to draw of less than about 3'' of water when measured at a flow rate of air of 1050 cc/min.

9. The filter material of claim 5 where said basic sodium compound is at least one member selected from the group consisting of sodium hydroxide, sodium carbonates, sodium phosphates and sodium borates.

10. The filter material of claim 9 having a resistance to draw of less than about 3'' of water when measured at a flow rate of air of 1050 cc/min.

11. A smoking article comprising a tobacco article in a smoke filtering relationship with a filter containing a composition of activated alumina impregnated with sodium permanganate and a basic sodium compound, said alumina containing less than about 6% by weight of silica based on said alumina, said alumina also having a surface area of at least about 100 m$^2$/gm and a pore volume of at least about 0.2 cc/gm, said sodium permanganate being present in an amount from about 5% to about 30% by weight of said composition, said basic sodium compound being present in an amount such that the molar ratio of said basic sodium compared to said sodium permanganate is from about 1/0.5 to about 1/20, said composition having a moisture content of from about 5% to about 30% by weight based on said composition; said composition having a particle size from about 10 to about 80 mesh U.S. Sieve Series, ASTME11-61.

12. The smoking article of claim 11 in which said filter material has admixed therewith from about 25% to about 50% by weight of activated carbon granules having a surface area from about 800 m$^2$/gm to about 1600 m$^2$/gm, the particle size of said activated carbon being less than the particle size of said activated alumina.

13. The smoking article of claim 12 in which said filter material has as said basic sodium compound at least one member selected from the group consisting of sodium hydroxide, sodium carbonates, sodium phosphates and sodium borates.

14. The smoking article of claim 12 in which said tobacco filter has a resistance to draw of less than about 3'' of water when measured at a flow rate of air of 1050 cc/min.

15. The smoking article of claim 11 in which said filter material has as said basic sodium compound at least one member selected from the group consisting of sodium hydroxide, sodium carbonates, sodium phosphates and sodium borates.

16. The smoking article of claim 15 in which said tobacco filter has a resistance to draw of less than about 3'' of water when measured at a flow rate of air of 1050 cc/min.

* * * * *